United States Patent [19]

Wood

[11] 4,442,891
[45] Apr. 17, 1984

[54] CUTTERS

[75] Inventor: Eric Wood, Northants, England

[73] Assignee: Insituform International N.V., Netherlands Antilles

[21] Appl. No.: 353,178

[22] Filed: Mar. 1, 1982

[51] Int. Cl.³ ............................................... E03F 3/06
[52] U.S. Cl. .................................. 166/55.2; 166/55.8; 409/143
[58] Field of Search ...................... 166/55, 55.2, 55.6, 166/55.7, 55.8; 409/143, 179

[56] References Cited

U.S. PATENT DOCUMENTS 2,942,092 6/1960 Cammann .......................... 166/55.7
4,197,908 4/1980 Davis et al. ......................... 409/143

Primary Examiner—Stephen J. Novosad
Assistant Examiner—William P. Neuder
Attorney, Agent, or Firm—Fred Philpitt

[57] ABSTRACT

The invention provides a cutter device for use especially in an underground pipeline or passageway such as a sewer which has been lined with a rigid resin lining, the cutter device serving to cut the lining where it covers lateral connections which must be re-opened. The cutter device according to the invention provides a cutter with a cutting bit which can be moved in an orbital fashion to enable the line of action of the cutter bit to maintain its angularity with respect to the angularity with which the lateral meets the main pipeline or passageway. The cutter bit preferably is a rotatable cutter bit, but in the alternative it may be for example a jet of liquid.

5 Claims, 9 Drawing Figures

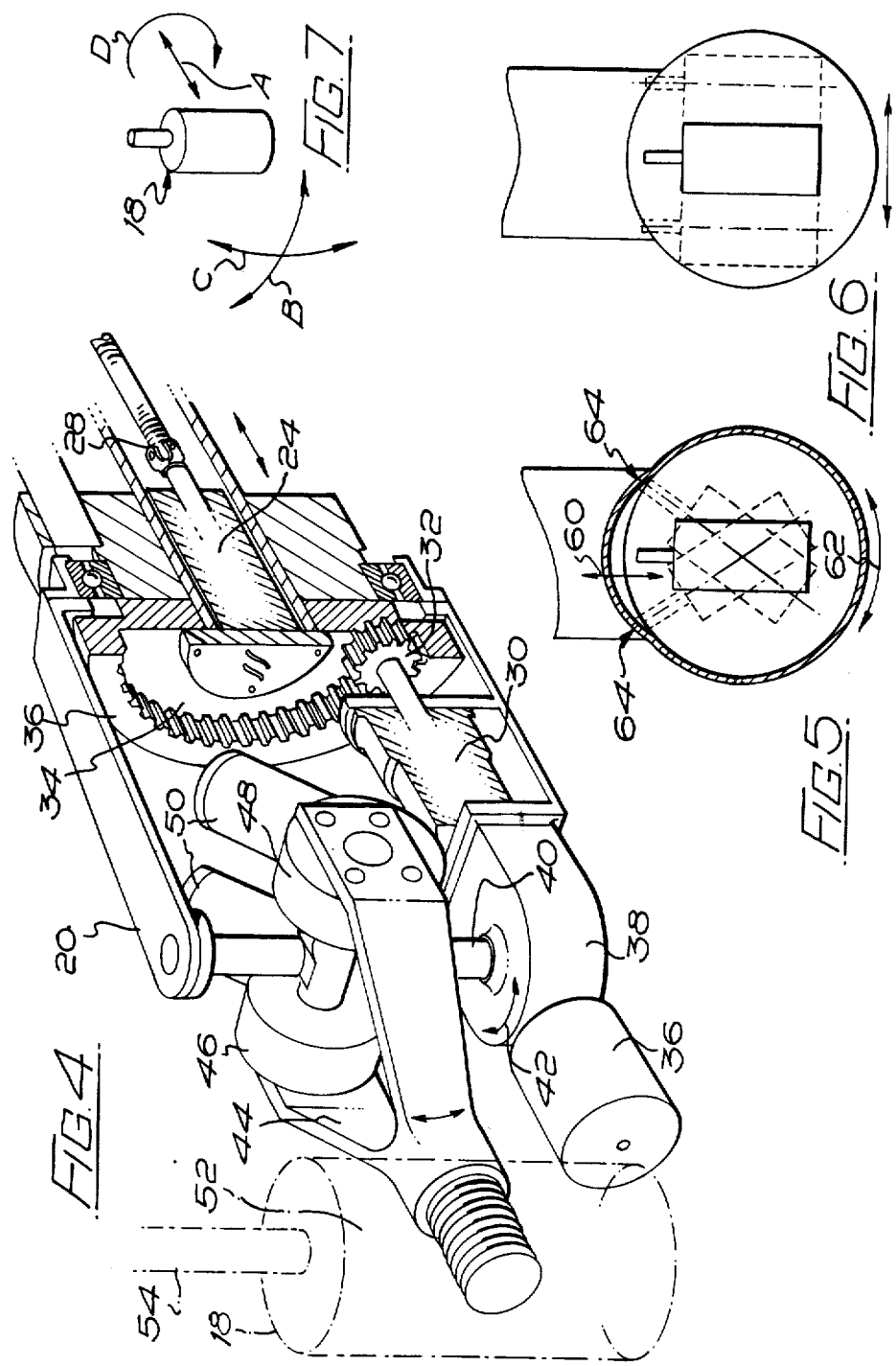

CUTTERS

This invention relates to cutters, especially but not exclusively to cutters for cutting apertures in a lining of an underground pipeline or passageway, in order to re-establish the connection between a lateral pipe and the inside of the underground pipeline or passageway.

BACKGROUND OF THE INVENTION

In accordance with an established lining process, for pipelines or passageways which are located underground, a flexible tubular liner is everted into the passageway using a liquid to evert the liner. The liner is held to the pipeline or passageway shape whilst synthetic resin which impregnates an absorbent layer of the liner is cured, whereby the pipeline or passageway is lined with what in effect is a rigid lining. This method has proved to be extremely successful, but does suffer from the disadvantage that the lining also extends across side connection apertures whereby side connecting or lateral pipes which previously led into the underground pipeline or passageway, become blocked. They must be re-opened, and the present invention is concerned with a cutter for performing this re-opening of the lateral or side connecting pipes.

The aforesaid lining process has found wide application in the lining of underground sewer pipes and passageways. Lateral connecting pipes to underground sewers, pipes or passageways typically will lead from domestic dwellings or other premises, and it is therefore easily understood that the connections between the sewer and the side connections or laterals must be re-established as soon as possible, and must also be established in an efficient manner, whereby the connecting aperture after lining and cutting is not substantially smaller than the original connecting aperture before lining.

As can be appreciated, various cutting devices have already been proposed, a typical one of which is disclosed in the U.S. Pat. No. 4,197,908. The known cutting devices are provided with a rotary cutter bit which is rotated about an axis which is substantially radial with respect to the pipe in which it operates. The cutter bit is adapted to be moved in an angular fashion about an axis which is longitudinal of the pipe, and also can be moved longitudinally of the pipe. Thirdly, the cutter bit can move radially outwards and inwards. These various movements are provided to enable the cutter bit to follow the contour of the opening which is covered by the lining material, to ensure the effective re-establishment of the connection between the lateral and main pipe. The radial movement of the cutter is related only to the depth of penetration of the cutter bit, and therefore the means enabling the cutter bit to follow the contour of the opening comprises the two motions being the angular adjustment of the cutter bit about the axis extending longitudinally of the pipe, and the longitudinal movement of the cutter bit. This control of the cutter movement is bound to have significant disadvantages in that the cutter bit axis, during the following of the said contour, varies with respect to the direction in which the lateral or side connecting pipe meets the main passageway, with the result that there can remain "ledges" of lining material overlapping the original opening size, and such ledges are a means for trapping debris and waste material to the detriment of the efficiency of the connection with the main passage, and in some cases leading to the eventual obstruction of the passage by blockage.

SUMMARY OF THE INVENTION

In the cutting device of the present invention, the cutter bit is mounted on a means enabling the cutter bit to move bodily in an orbital path, keeping approximately the same angular relationship between the rotation axis of the cutter, and the axis of the side connection or lateral where it meets the main pipeline or passageway.

It is preferred that the said angular relationship will be that the rotary axis of the cutter remains parallel to the axis of the side connection or lateral, during the orbital movement of the cutter, as it follows the contour of the lateral or side connection opening.

The beneficial effect of this arrangement, in the light of what has been said previously, will be readily appreciated, because the cutter can cut the lining material flush with the edge of the side connection opening, thereby eliminating the "ledges" as referred to above.

Additionally, it is preferred that the cutter bit is mounted for angular adjustment in order to suit lateral or side connecting pipes which meet the main pipeline or passageway at different angles. It is envisaged however, that once the angularity of the cutter is set relative to the angle at which the side connection meets the main pipeline or passageway, it will remain fixed whilst the cutter head moves in an orbital path following the contour of the side connection aperture.

Although the cutter is adapted to move orbitally to follow the side connection contour, in practice it may in fact be moved on a side by side basis, being indexed at each stroke, in much the same fashion as the spot on a television monitor, for the removal of a region of lining material covering the side connection aperture. This operation might take place if the cutting equipment is automated, which is possible using appropriate control means.

The movements of the cutter head may be controlled by means of suitable electric motors, which preferably are stepping motors whose movement can be controlled by digital signals, such motors being suitably mounted in the cutter assembly.

The assembly may in addition be provided with a fourth degree of movement, being the ability to rotate the cutter head about an axis which extends longitudinally of the pipeline or passageway, for the bringing of the cutter bit into general alignment with the side connection to be reestablished.

DESCRIPTION OF THE DRAWING

An embodiment of the invention will now be described, by way of example, with reference to the accompanying drawings, wherein:

FIG. 4 shows a perspective view part of the cutter assembly, parts being cut away to show the internal structure details;

FIGS. 5 and 6 are diagrammatic comparison views respectively showing how a conventional cutter operates, and how the cutter according to the embodiment operates, the view being along the axis of the sewer in which respective cutters are located;

FIG. 7 is a diagram to indicate the degrees of movement which the cutter head of the cutter according to the invention can execute.

DETAILED DESCRIPTION

Figure 1:
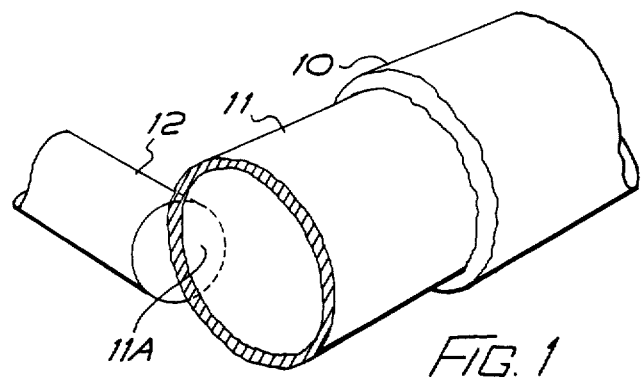
FIG. 1 shows in perspective and broken away view, an underground sewer pipe with a side connecting pipe connected thereto, the sewer pipe having been lined with a rehabilitating lining.

Referring to the drawings, in FIG. 1 an underground sewer is indicated by numeral 10, and it is assumed that it has, because it is in a state of disrepair, been relined with a lining 11. The Figure also shows how a house side connection 12 couples with the sewer 10 so that the house waste will be discharged into the sewer.

The lining 11 shown is of cured synthetic resinous material having a reinforcing material such as a felt embedded therein. It is now required urgently to remove the portion 11A of lining covering the side connection aperture, and a cutter according to the invention is used to perform this operation.

Figure 2:
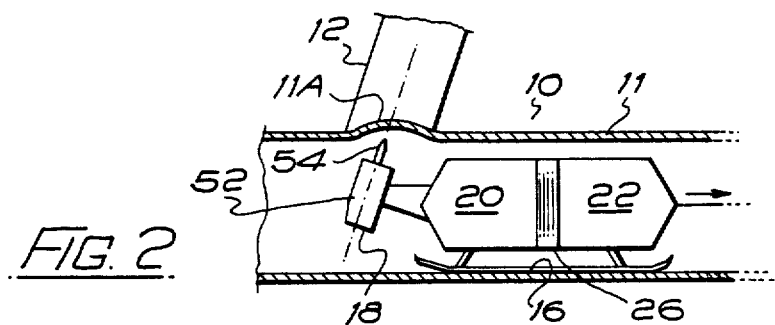
FIG. 2 shows the arrangement of FIG. 1 in plan with a cutter unit according to the invention operatively positioned as regards the side connection opening.

FIG. 2 shows how a cutter is positioned inside the sewer after the lining operation, and although not shown the cutter is connected to a control van at ground level, and remote from the cutter. Also located inside the sewer is a TV camera by which the cutting operation can be observed on a TV monitor in the van at ground level. The cutting may take place automatically or manually.

Figure 3:
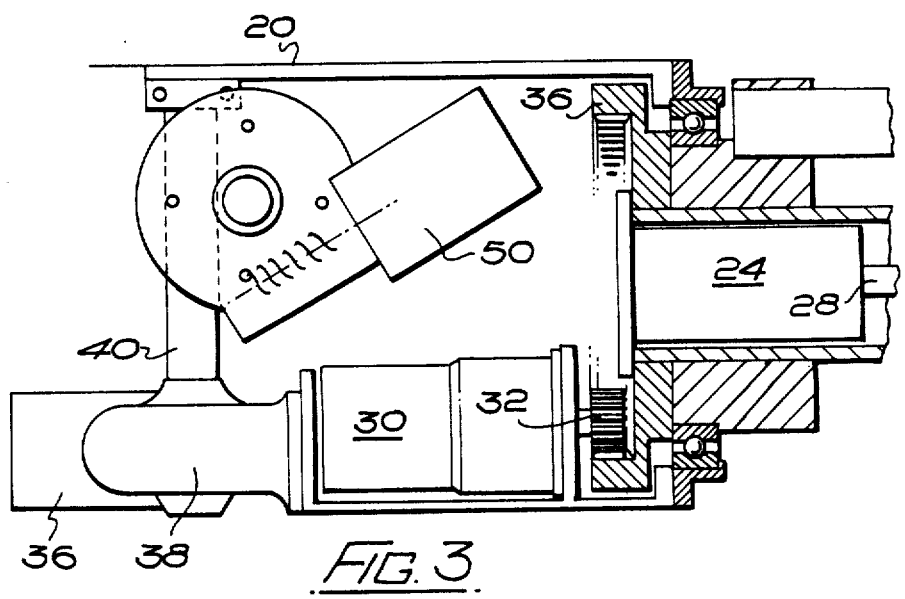
FIG. 3 shows in side view, details of part of the cutter assembly.

Referring to FIGS. 2, 3 and 4 for a description of the cutter, in FIG. 2 the cutter is shown in side elevation, and comprises a body 16 on which is mounted a cutting head 18. The body is in two telescoped parts 20, 22, which can be moved together or apart by means of a motor so that the front part 20 of the body can be moved into a predetermined position in the passageway. A flexible gaiter 26 forms a seal between the telescopically interfitted parts to ensure that there is no ingress of foreign matter. Telescoping is achieved by means of a worm screw 28 which is driven by the motor 24 (FIG. 4).

The front part 20 of the cutter assembly, which carries the cutting head 18 has various other motors for the manipulating movement of the cutter head 18. A motor 30 inside the casing 20 is provided with a pinion 32 which engages a gear annulus 34 connected to an end plate 36 supporting the casing of the front part 20, so that rotation of the motor 30 causes rotation of the entire front section 20, such rotation taking place about an axis which is generally the elongated axis of the cutting equipment, and extends in a direction parallel to the axis of the passageway.

A motor 36 at the front end of the front section 20 drives a worm which engages a worm wheel in a casing 38, and a shaft 40 secured to the worm wheel is mounted for rotation about its axis, on the front section 20. Therefore, by driving the motor 36, the said shaft 40 can be turned about its axis, as indicated by the arrow 42 whereby the angularity of a Y-shaped bracket 44 carried by the shaft 40 can be adjusted. The axis of adjustment of the said bracket 44 is at right angles to the axis about which the front section 20 can be turned by the motor 30.

The said bracket 44 is mounted on the shaft 40 by means of a transverse shaft 46 on which are carried worm wheels in worm wheel casings 48, and the said worm wheels are engaged by two further motors 50 through worms connected to the motor shafts. Rotation of the said motors 50 causes swinging of the bracket 44 about an axis which is at right angles to the axis of the shaft 40 for the pivoting of the cutting head. The cutting head, which is shown in dotted lines in FIG. 4, comprises a small motor 52 having a chuck to which is connected a replaceable rod like cutting bit 54.

The movement facility of the cutter head described enables the cutting head to be moved bodily in an orbital fashion, so as to follow the contour of the side connection aperture, whilst maintaining a fixed relationship between the axis of rotation of the cutter bit and the axis of the side connection pipe, for the effective cutting away of the lining material covering the side connecting aperture.

This can be understood if reference is made to FIG. 7 which illustrates schematically the degrees of movement which the cutter head has. Firstly, it is capable of being moved linearly of the passage (arrow A) by means of the motor 24, and secondly, it can be swung about the axis of the shaft 40 (arrow B) by the motor 36, and these two movements give the cutter head bodily movement whereby the axis of rotation of the cutter bit can be maintained substantially in fixed relationship with the axis of the side connection, and in particular can be maintained parallel to the axis of the side connection as shown in FIG. 2. The two additional degrees of movement of the cutter, namely that provided by the two motors 50 (arrow C) are for causing the cutter bit to move substantially radially of the passageway, to enable the cutter bit to penetrate the lining material to be cut, and secondly (arrow D) by motor 30 bodily to adjust the angular position of the front section 20, for the initial placement of the cutter bit axis in the direction of the axis of the side connection. When this initial placement is set, motor 30 can be held still during the subsequent cutout operation. Although not shown, the cutter head 18 can be provided with yet a further degree of movement, which is that the cutter head is tiltable to a preset angle corresponding to the angle at which the side connection meets the main pipe, because not all side connections meet the main pipe at right angles.

FIGS. 5 and 6 illustrate how the movement of the cutter head in utilising a cutter according to the present invention differs from the movement of the cutter head when utilising a cutter head according to the known construction. In FIGS. 5 and 6, the side connection is shown as meeting the main pipeline at right angles, and a lining is also shown covering the side connection. The known cutter head is shown in FIG. 5 in position with the cutter bit on the axis of the side connection. The arrow 60 shows the fashion in which the cutter bit can be moved inwardly and outwardly for the cutting of the lining covering the opening of the side connection, and the arrows 62 also show the manner in which the cutter head can be tilted about an axis extending along the passageway. It will be appreciated that at the edge regions 64, the cutting is ineffective, because of the angularity of the cutter bit. In FIG. 6 by comparison, the cutter head is shown again in full lines in the position on the centre of the side connection, but the dotted line positions show how the cutter head can be moved bodily to the outer positions for the effective cutting of the lining material in the peripheral regions and around the contour of the side connection opening. According to a further preferred feature of the invention, the adjustment of the angularity of the cutter head per se is extremely suitable for arranging for the alignment of the axis of the cutter bit with the axis of the side connecting pipe. If this adjustment facility is not provided, then inevitably in cutting away the lining material covering a side connection, there will be a ledge of remaining lining material which can constitute a means of collecting debris and waste material, and of causing a blockage. By suitably inclining the cutter bit axis however, it can be ensured that the side connection opening is reinstated to the full extent which existed prior to the lining oepration.

It is possible within the scope of the invention to construct cutters according to other constructions, such as by using air motors or hydraulic rams, whilst retaining the bodily movement facility of the cutter head, and in order to give the cutter head true bodily movement, without any variation in the angularity of the cutting bit with respect to the side connection pipe, instead of connecting the cutter head directly to the shaft by means of the bracket, a parallogramtype linkage can be used. An alternative construction is illustrated in FIGS. 8 and 9 and is described later.

The movement of the cutter bit in cutting out a side connection can be controlled by observing the cutting operation using a television camera and a monitor in the van located at ground level, but in the alternative, the operation can be controlled automatically and if the various motors used are electrical stepping motors, automation is much easier.

The automatic operation would be achieved by suitable computing and processing equipment, and the cutter head may be moved according to a programme which is preset in the control equipment by initially tracing the cutter bit manually around the side connection opening or by positioning or selected points on the opening before lining, or by pre-programming the control equipment, or by the use of a template.

Figure 8:
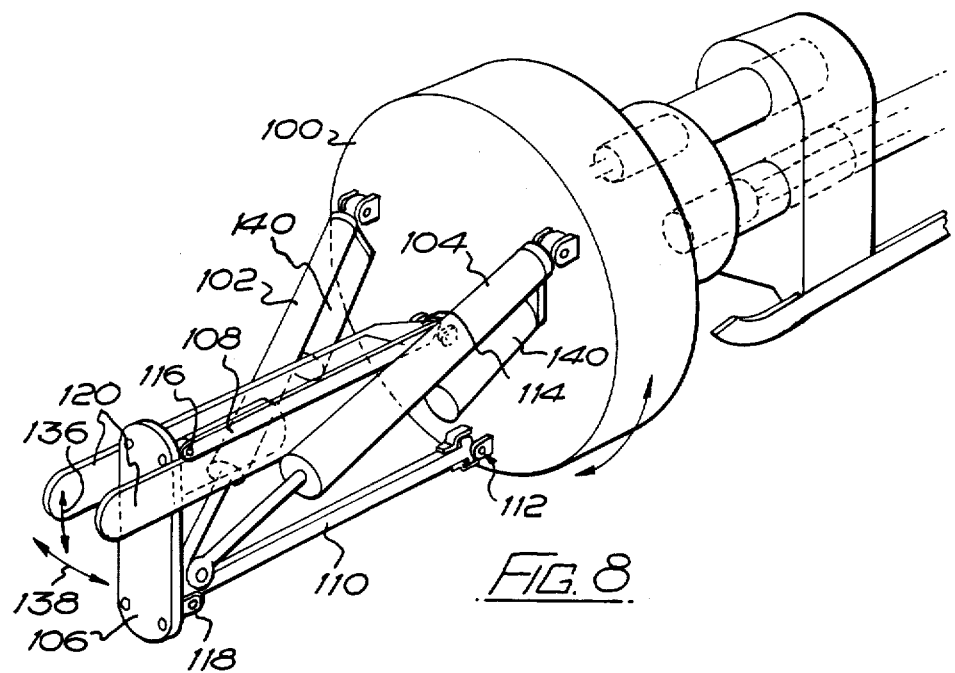
FIGS. 8 and 9 show respectively in perspective view and side view a cutter unit assembly according to another embodiment of the invention.
Figure 9:
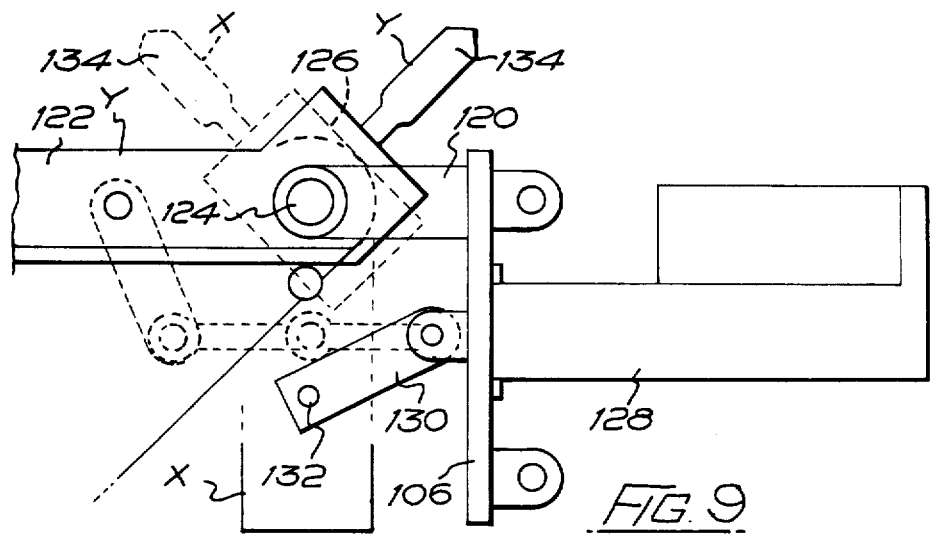

Referring now to FIGS. 8 and 9, an alternative arrangement for the mounting of the cutter head is shown, and this mounting provides for the effective manipulation of the cutter head in a slightly different fashion from the arrangement described previously. The front section of the cutter unit is indicated by reference 100, and the motions of the front section relative to the rear section are the same as in the previous embodiment. However, mounted on the front section are a pair of fluid actuators 102 and 104 which are connected between the front end of the section 100 and a mounting plate 106 for the cutter head. The mounting plate 106 is carried by means of two parallel arms 108 and 110, the arms 108 and 110 being coupled to the section 100 by means of hooks joints 112 and 114. The arms 108 and 110 are connected by simple pivot joints 116 and 118 to the plate 106. Plate 106 has a pair of forwardly projecting support lugs 120 which, as shown in FIG. 9, pivotally support a mounting plate 122 for limited pivotal movement about the pivot 124. Plate 122 carries the cutter head unit 126.

An actuator 128, best seen in FIG. 9, has an actuator rod which extends through the plate 106 and is connected to a link 130 which is pivotally connected in its turn at 132 to the mounting plate 122. With actuation of the actuator 128, the actuator rod advances and swings the plate 122 from the position X, through an angular range to the other extreme position Y. It is to be noted that the cutter motor 126 is mounted on the plate 122 so as to lie at an angle of 45° whereby, in the position X, the cutter bit 134 lies at an angle of 45° to the left, and movement of the plate 122 to the position Y brings the cutter bit 134 to a position angled at 45° to the right, whereby a complete 90° range of angular movement of the cutter bit 134 can be achieved. Once the angular position ofthe cutter bit 134 is set by the actuator 128, it remains in that position during the subsequent cutting operation. For the movement of the plate 106 in a global or orbital fashion, the actuators 102 and 104 are used. If they are actuated together, then the plate 106 swings as indicated by arrow 136 in what, for the purposes of FIG. 8, might be termed a vertical plane, but with differential actuation of the actuators 104, swinging as indicated by arrow 138 in a horizontal plane can be achieved. It is important therefore that the actuators 102 and 104 be capable of independent and differential actuation. These actuators instead of being fluid operated members, may in fact be feed screw devices operated by electric motors such as motors 140 shown in FIG. 8.

As an alternative to using a rotary cutter bit, a cutter bit in the form of a jet of high pressure liquid may be used so that the line of action is in fact a stream of liquid.

I claim:

1. A cutting device, especially but not exclusively for cutting apertures in the lining of an underground pipeline or passageway, wherein said device is adapted to be located in the pipeline or passageway and includes a powered cutter bit having an axis of operation which is transverse to the pipeline or passageway axis when the cutter device is positioned therein, and cutter bit mounting means enabling the cutter bit to move bodily in an orbital path while keeping approximately the same angular relationship between the axis of operation of the cutter bit and the axis of a side connection or lateral where it meets the main pipeline or passageway and including adjustment means for adjusting the angle between the cutter bit axis and the axis of the pipeline or passageway.

2. A cutter according to claim 1 including a first motor actuator connected to the cutter bit and operable to move the cutter bit along the passageway, a second motor actuator connected to the cutter bit and operable to swing the cutter bit about a first axis which is at right angles to the axis of the pipeline and a third motor actuator connected to the cutter bit and operable to swing the cutter bit about a second axis which is at right angles to the said first axis and is at right angles to the axis of the pipeline.

3. A cutter device according to claim 2, wherein said motor actuators are electrically operated digital stepping motors.

4. A cutter device according to claim 1, wherein the cutter bit is carried on a plate supported by a parallelagram linkage, and the movement of the plate is controlled by a pair of piston and cylinder actuators which are independently operable to swing the plate about a first axis at right angles to the pipeline axis, and are operated together to swing the plate about a second axis which is at right angles to the first axis and is at right angles to the pipeline axis.

5. A cutter device according to claim 4, wherein the cutter bit is carried by an auxilliary plate which is pivotably mounted on the first mentioned plate, and the angular position of same can be adjusted so as to alter the angle of action of the cutter bit by means of an actuator connected between the first mentioned plate and said auxilliary plate.

* * * * *